(12) United States Patent
Pearce et al.

(10) Patent No.: US 10,190,348 B2
(45) Date of Patent: Jan. 29, 2019

(54) SYSTEMS AND METHODS FOR A REFUELING REQUEST

(71) Applicant: Ford Global Technologies, LLC, Dearborn, MI (US)

(72) Inventors: Russell Randall Pearce, Ann Arbor, MI (US); Charles Qin, Nanjing (CN); Neil Wu, Nanjing (CN); Le Hong, Nanjing (CN); Dennis Seung-Man Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 15/351,206

(22) Filed: Nov. 14, 2016

(65) Prior Publication Data
US 2018/0135342 A1    May 17, 2018

(51) Int. Cl.
| | |
|---|---|
| B60K 15/03 | (2006.01) |
| E05D 11/10 | (2006.01) |
| E05D 7/00 | (2006.01) |
| E05F 1/10 | (2006.01) |
| E05F 15/70 | (2015.01) |
| E05F 15/60 | (2015.01) |
| B60K 15/05 | (2006.01) |
| B60K 15/035 | (2006.01) |
| B67D 7/04 | (2010.01) |
| B60K 15/04 | (2006.01) |

(52) U.S. Cl.
CPC ........ *E05D 11/10* (2013.01); *B60K 15/03504* (2013.01); *B60K 15/05* (2013.01); *E05D 7/00* (2013.01); *E05F 1/10* (2013.01); *E05F 15/60* (2015.01); *E05F 15/70* (2015.01); *B60K 2015/0319* (2013.01); *B60K 2015/03576* (2013.01); *B60K 2015/0461* (2013.01); *B60K 2015/0538* (2013.01); *B60Y 2200/92* (2013.01); *B67D 7/0478* (2013.01); *E05Y 2900/534* (2013.01)

(58) Field of Classification Search
CPC .. E05D 11/10; E05D 7/00; E05F 15/60; E05F 1/10; E05F 15/70; B60K 15/03504; B60K 15/05; B60K 2015/03576; B60K 2015/0319; B60K 2015/0538; B60K 2015/0461; B60Y 2200/92; B67D 7/0478; E05Y 2900/534
See application file for complete search history.

(56) References Cited

U.S. PATENT DOCUMENTS

| | | |
|---|---|---|
| 5,390,974 A | 2/1995 | Theodorakakos |
| 8,561,443 B2 | 10/2013 | Sun et al. |
| 9,340,106 B2 | 5/2016 | Dudar et al. |
| 2014/0026992 A1 | 1/2014 | Pearce et al. |

*Primary Examiner* — Jason K Niesz
(74) *Attorney, Agent, or Firm* — Julia Voutyras; McCoy Russell LLP (57) ABSTRACT

Methods and systems are provided for opening a refueling door. In one example, a method may include gradually opening the refueling door in proportion to a fuel tank depressurization rate.

20 Claims, 6 Drawing Sheets

SYSTEMS AND METHODS FOR A REFUELING REQUEST

FIELD

The present description relates generally to a refueling request switch and an electrorheological fluid in a refueling door.

BACKGROUND/SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

Diverting fuel vapor located in the fuel tank to the fuel vapor canister prior to refueling is especially important for hybrid electric vehicles (HEVs). Such vehicles are designed to run primarily on an electric motor and only occasionally use the internal combustion engine, resulting in fewer opportunities to purge the fuel vapor canister. Furthermore, HEVs feature a fuel tank isolation valve that seals the fuel tank to maintain fuel vapor within the tank during vehicle operations. Without regular purging of the evaporative emission system, normal vaporization of the liquid fuel in the tank will cause the tank to become pressurized above atmospheric pressure. Prior to a refueling event, fuel tank vapor needs to be vented to the fuel vapor canister to prevent evaporative emissions via the fuel filler neck. Further, an over-pressurized tank (e.g., fuel tank pressure greater than ambient pressure) may result in liquid fuel splashing out of the tank when opened.

To lower the fuel tank pressure to atmospheric pressure prior to refueling and therefore prevent fuel vapors from escaping into the atmosphere, HEVs come equipped with a dashboard-mounted refuel request button that a driver presses prior to refueling. Requesting a refueling event triggers a controller to open the fuel tank isolation valve, depressurizing the fuel tank prior to allowing access to the fuel filler neck. However, the location of these refuel request buttons on the dashboard is unintuitive and inconvenient. If a driver forgets to press the button prior to exiting the vehicle at the refueling station, he or she must re-enter the vehicle in order to prepare the vehicle for refueling. Further, a refueling operator approaching the refueling door from the outside of the vehicle has no control over the tank depressurization process. Additionally or alternatively, after depressing the button, there is no visual indication to the driver that the fuel tank is being depressurized, which may result in excessive depressions of the button.

The inventors herein have recognized the above described problems, and have developed systems and methods to at least partially address these issues. In one example, the issues described above may be addressed by a method comprising gradually opening a refueling door in proportion to a fuel tank depressurization rate via an amount of current supplied to an electrorheological fluid located in a locking mechanism of the refueling door. In this way, the refueling door gradually opens as the fuel tank is depressurized, providing a visual indication to a driver or fuel attendant that the refueling request is received.

As one example, after depressing a fuel tank fill-up request button, which may be a dashboard-mounted or externally-mounted button, current flows to the electrorheological fluid to maintain the refueling door closed. The fuel tank is depressurized and the rate of depressurization is estimated. The current to the electrorheological fluid is decreased and the refueling door is incrementally opened as a force of a spring overcomes the viscosity of the electrorheological fluid. In one example, the current is proportional to the depressurization rate such that the refueling door is fully open once the fuel tank is sufficiently pressurized. By doing this, the refueling door is moved to a fully open position when the fuel tank pressure is substantially equal to atmospheric pressure. As such, the refueling door gradually opening provides a visual indication of receipt of the refueling request and a duration of time needed to depressurize the fuel tank to atmospheric pressure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-3B are shown approximately to scale.

DETAILED DESCRIPTION

Figure 2:
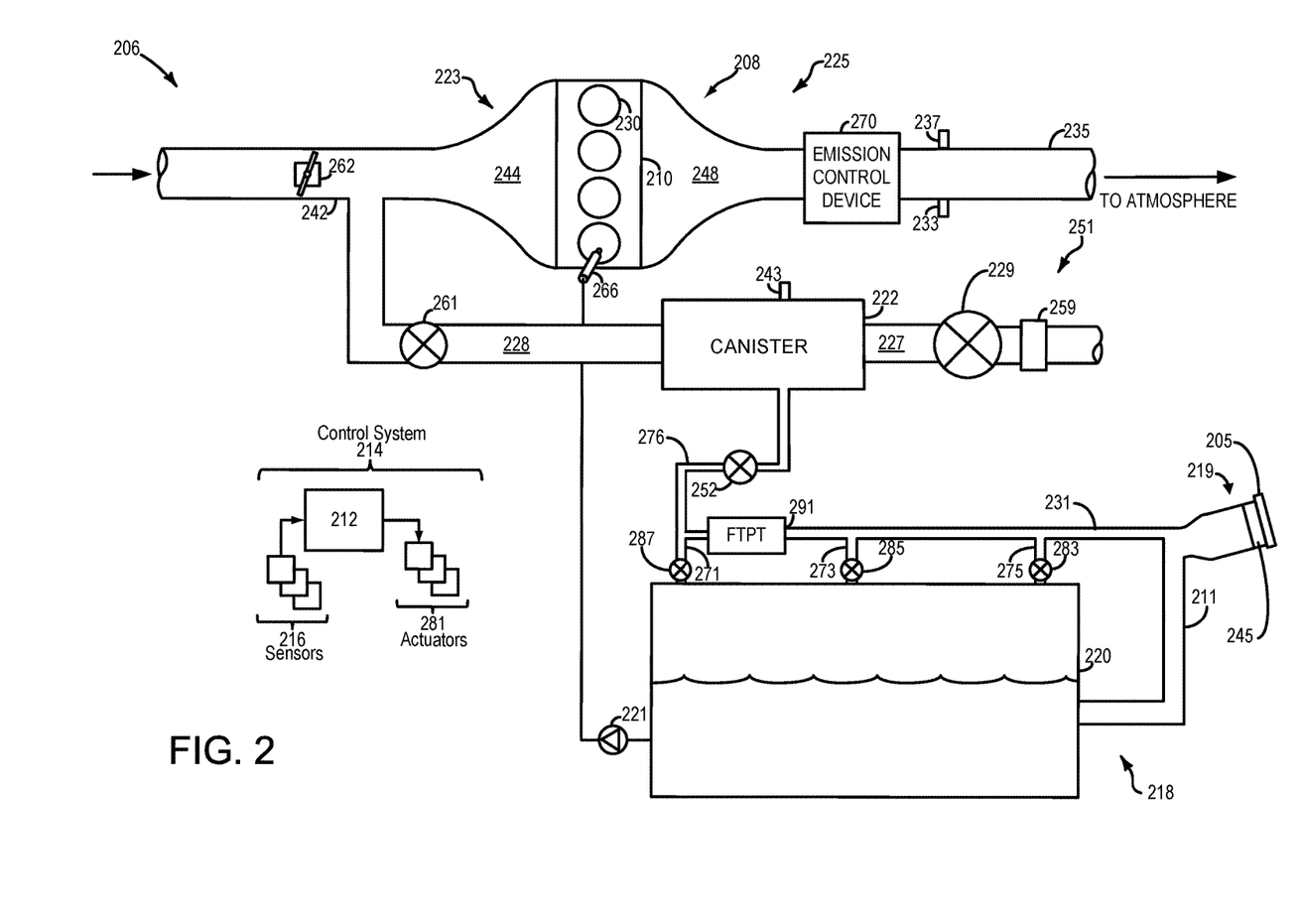
FIG. 2 schematically shows an example vehicle system with a fuel system and an emissions control system.
Figure 3A:
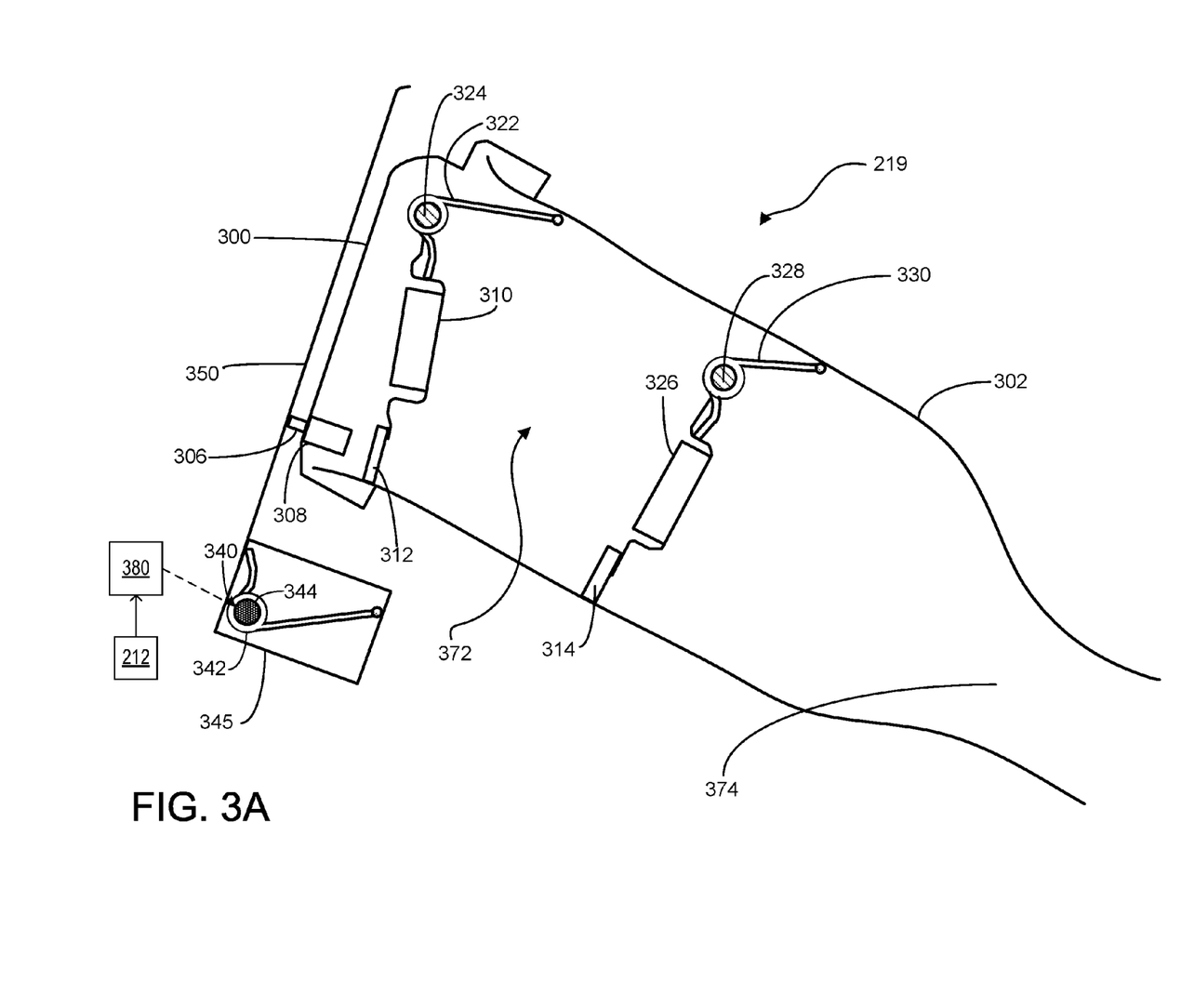
FIG. 3A shows a side perspective of an example illustration of a refueling assembly that may be included in the fuel system of FIG. 2.
Figure 3B:
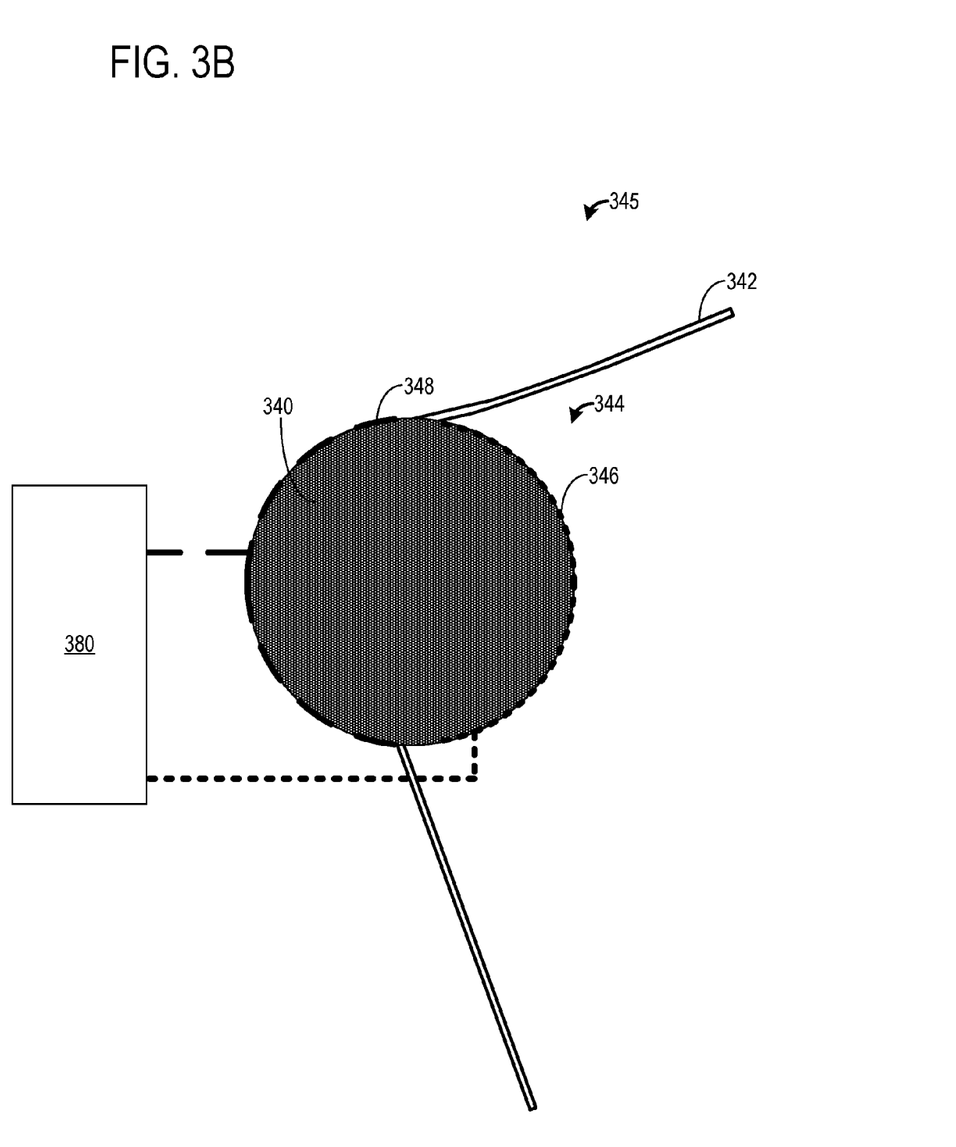
FIG. 3B shows a detailed view of a locking mechanism of a refueling door including an electrorheological fluid and electrodes.
Figure 4:
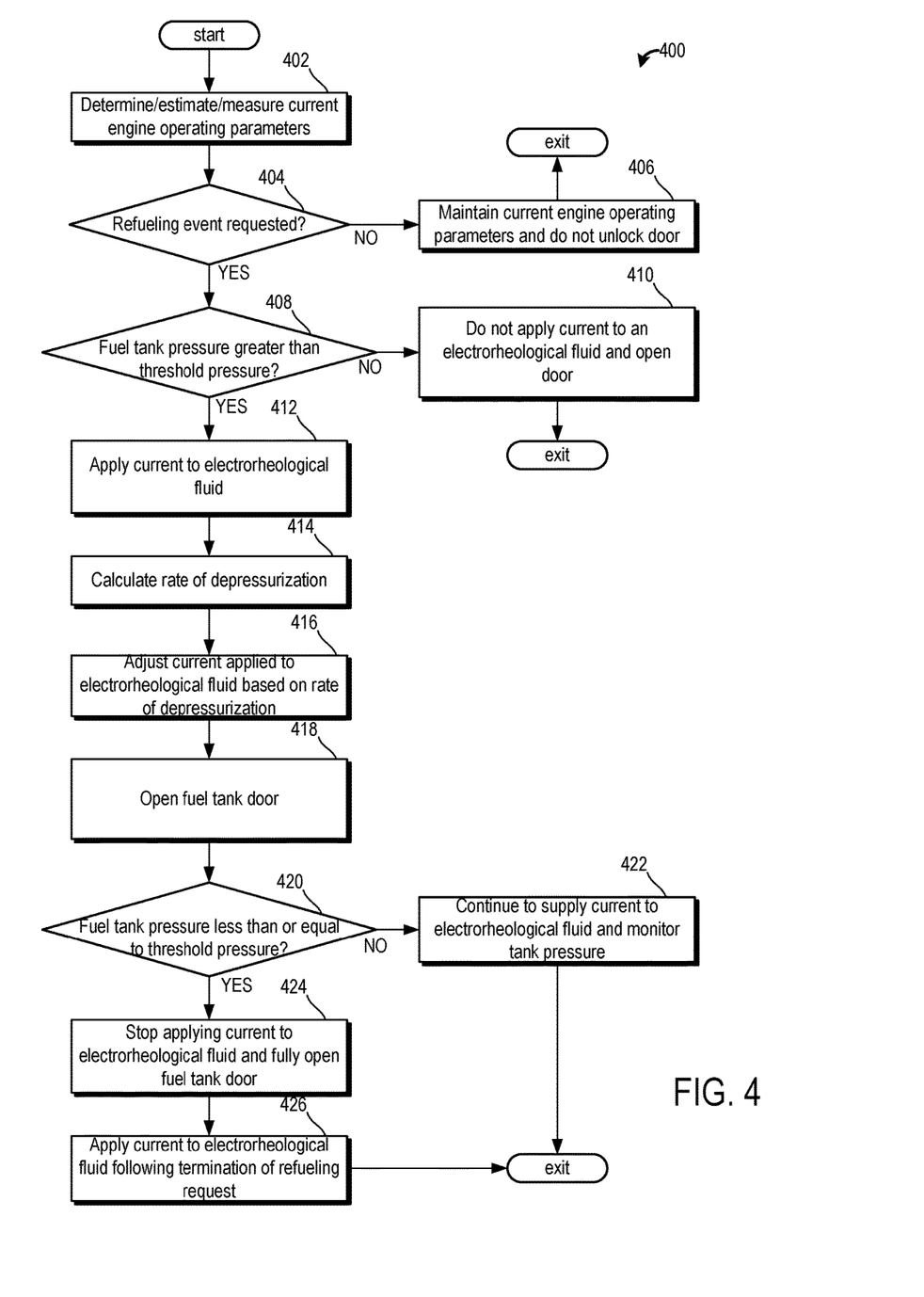
FIG. 4 shows a method for operating the electrorheological fluid in response to a refueling button being depressed.
Figure 5:
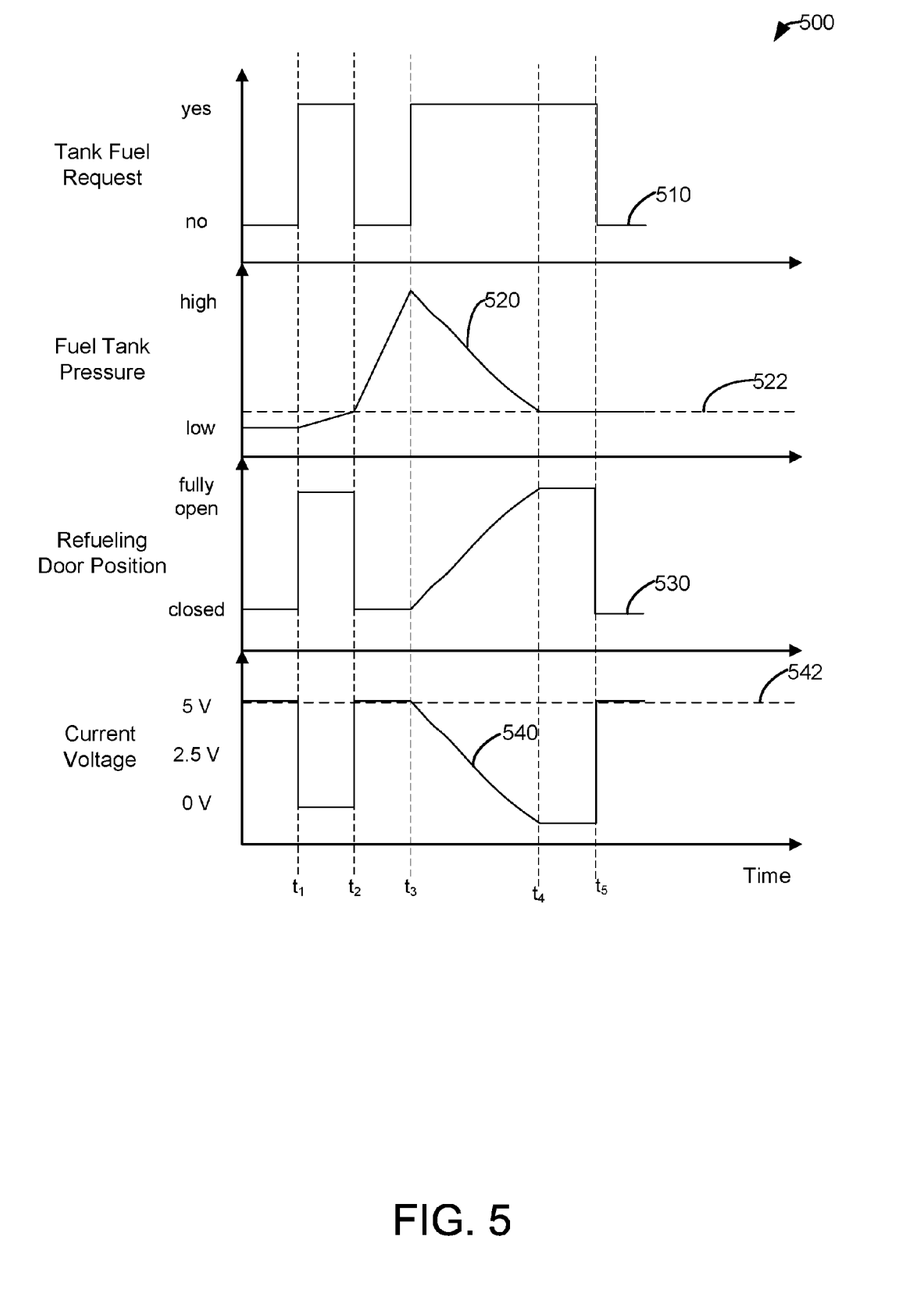
FIG. 5 shows an example timeline for depressurizing a fuel tank in response to a tank refueling request.

The present description is related to refueling a vehicle. Specifically, methods and systems for a refueling door are described. The refueling door includes a locking mechanism having a spring configured to press outwardly against the refueling door, forcing the refueling door into a fully open position. The locking mechanism further comprises a hinge coupled to the spring, the hinge having an electrorheological fluid and electrodes for supplying current of a varying voltage to the fluid, thereby adjusting a viscosity of the fluid as voltage is adjusted. In one example, the viscosity of the fluid increases as the voltage increases. The systems and methods may be implemented in a hybrid vehicle including a fuel system, such as the hybrid vehicle and fuel system depicted in FIG. 1. The vehicle may include a fuel system and an emissions control system as depicted in FIG. 2. The fuel system may include a capless refueling assembly. Access to the refueling assembly may be regulated by a locking refueling door, as shown in FIG. 3A. The locking mechanism is shown in greater detail in FIG. 3B. Depressurizing a fuel tank in response to a refueling request may be controlled as shown in the method of FIG. 4, which further includes gradually opening the refueling door based on a depressurization rate. An operating sequence for operating the refueling door and adjusting the viscosity of the electrorheological fluid in response to the refueling request is shown in FIG. 5.

FIGS. 1-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 1:
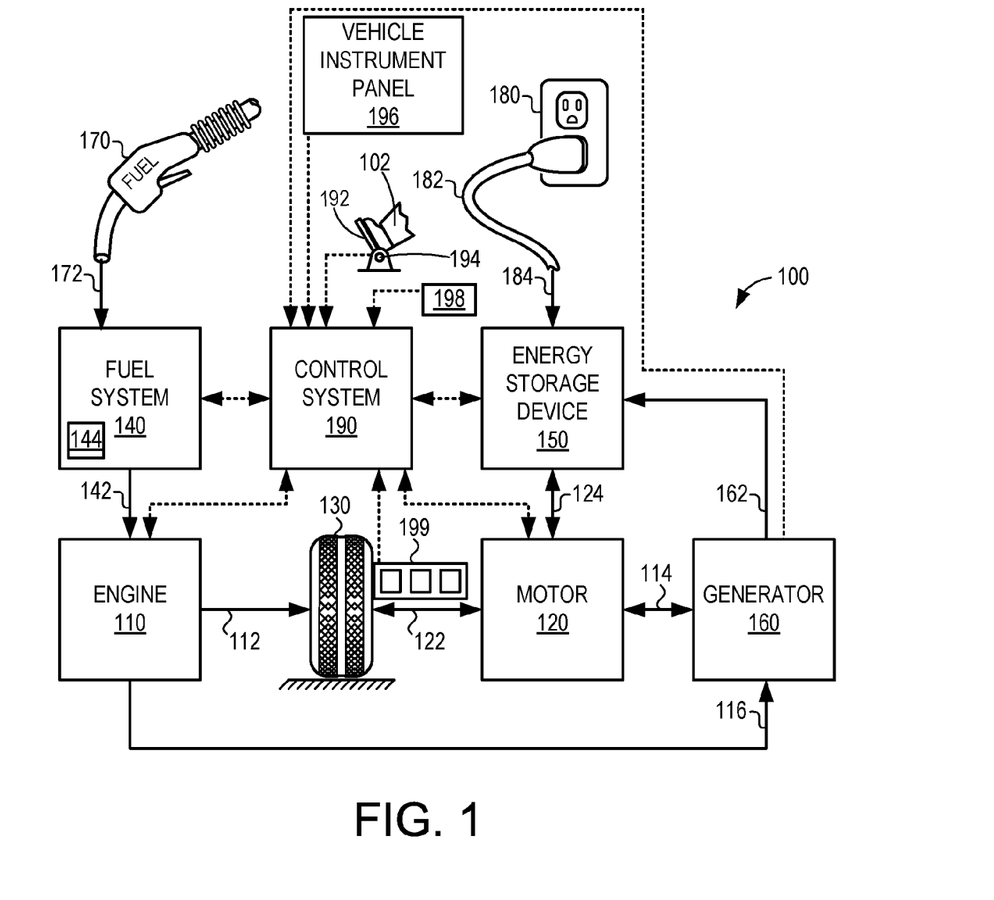
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge the energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. For example, as described in more detail below, the vehicle instrument panel 196 may include a text-based display which may indicate an open refueling door or a non-functional refueling door switch. The vehicle instrument panel 196 may also include various input portions for receiving an operator input, such as buttons, touch screens, voice input/recognition, etc.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel systems.

Vapors generated in fuel system 218 may be routed to an evaporative emissions control system 251 via vapor recovery line 231, which includes a fuel vapor canister 222, before being purged to the engine intake 223. Vapor recovery line 231 may be coupled to fuel tank 220 via one or more conduits and may include one or more valves for isolating the fuel tank during certain conditions. For example, vapor recovery line 231 is coupled to fuel tank 220 via one or more of a combination of conduits 271, 273, and 275.

Further, in some examples, one or more fuel tank vent valves may be included in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system 219 may include a refueling access seal 205 for sealing off the fuel filler system from the atmosphere. Refueling system 219 is coupled to fuel tank 220 via a fuel fill line or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the refueling access seal 205 may be configured as a fuel cap, and may remain locked via refueling lock 245 while pressure or vacuum in the fuel tank is greater than a threshold pressure. In response to a refuel request, e.g., a vehicle operator initiated request, the fuel tank may be depressurized and the fuel cap unlocked after the pressure or vacuum in the fuel tank falls below the threshold pressure, which is substantially equal to ambient pressure in one example. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm. In one example, the latch or clutch includes an electrorheological fluid which changes in viscosity in response to an amount of current delivered to the fluid. By increasing the viscosity of the fluid, the latch or clutch may be at least partially locked, prohibiting a driver or fuel attendant inserting a refueling pump into the fuel fill line 211.

In some embodiments, refueling lock 245 may be a filler pipe valve located at a mouth of fuel fill line 211. In such embodiments, refueling lock 245 may not prevent the removal of a fuel cap. Rather, refueling lock 245 may prevent the insertion of a refueling pump into fuel fill line 211. The filler pipe valve may be electrically locked, for example by a solenoid, or mechanically locked, for example by a pressure diaphragm. The filler pipe valve may include the electrorheological fluid described above, wherein current to the fluid is increased in response to the refueling request. As such, the valve remains locked until the fuel tank pressure falls below the threshold pressure.

In some embodiments, refueling lock 245 may be a refueling door lock, such as a latch or a clutch which locks a refueling door located in a body panel of the vehicle. The refueling door may be electrically locked, for example by a solenoid, or mechanically locked, for example by a pressure diaphragm. In embodiments where refueling lock 245 is locked using an electrical mechanism, refueling lock 245 may be unlocked by commands from controller 212, for example, when a fuel tank pressure decreases below a pressure threshold. For example, the refueling door may include an electrorheological fluid, where the door is locked by increasing current delivered to the fluid in response to the refueling request. The refueling door may gradually open as the fuel tank is depressurized toward the threshold pressure by incrementally decreasing current delivered to the electrorheological fluid. In embodiments where refueling lock 245 is locked using a mechanical mechanism, refueling lock 245 may be unlocked via a pressure gradient, for example, when a fuel tank pressure decreases to atmospheric pressure.

In some embodiments, refueling system 219 may be a capless design. In such embodiments, refueling access seal 205 may be considered a refueling access door located in the body panel of the vehicle and refueling lock 245 may lock the refueling access door. Refueling lock 245 may operate as described in the above examples. An example of a capless refueling system with a refueling door locking mechanism comprising the electrorheological fluid is described further herein and with regards to FIG. 3.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 is provided to the fuel vapor canister 222 for purging. In some examples, vent line 227 may include an air filter 259 disposed therein upstream of a canister 222.

Flow of air and vapors between canister 222 and the atmosphere may be regulated by a canister vent valve 229. Canister vent valve 229 may be a normally open valve, so that fuel tank isolation valve (FTIV) 252 may control venting of fuel tank 220 with the atmosphere. FTIV 252 may be a normally closed valve that when opened allows for the venting of fuel vapors from fuel tank 220 to canister 222. Fuel vapors may then be vented to atmosphere via canister vent valve 229, or purged to engine intake system 223 via canister purge valve 261.

Fuel system 218 and emission control system 251 are linked by FTIV 252. FTIV 252 may be coupled between fuel tank 220 and canister 222 within conduit 276. FTIV 252 may be actuated during engine-on conditions to decrease the pressure in fuel tank 220 by venting fuel vapor to canister 222. During refueling events, FTIV 252 may be utilized to decrease the pressure in fuel tank 220 to a threshold pressure substantially equal to ambient pressure, in one example. It will be appreciated that the threshold pressure may be based on pressures different than ambient without departing from the scope of the present disclosure. FTIV 252 may be positioned between the fuel system and the evaporative emissions system, the FTIV 252 configured to isolate the fuel tank from the purge when closed. FTIV 252 may be configured to isolate the fuel tank 220 from the evaporative emissions system when closed, such that no other valve may be opened to fluidly couple the fuel system to the evaporative emissions system. FTIV 252 may be configured to isolate the fuel system from the evaporative emissions system when closed and further configured to partially open during fuel tank purging conditions and configured to completely open during refueling conditions. FTIV 252 may be further configured to isolate refueling vapors from diurnal vapors while closed.

The vehicle system 206 may further include a control system 214. Control system 214 is shown receiving information from a plurality of sensors 216 (various examples of which are described herein). As one example, sensors 216 may include exhaust gas sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include fuel injector 266, throttle 262, fuel tank isolation valve 252, and refueling lock 245. The control system 214 may include a controller 212. The controller may receive input data from the various sensors, process the input data, and trigger the actuators in response to the processed input data based on instruction or code programmed therein corresponding to one or more routines. Control system 214 may be configured with instructions stored in non-transitory memory that cause controller 212 to perform control routines via one or more actuators 281 based on information received via one or more sensors 216. An example control routine is described herein and with regard to FIG. 4.

The example control routine may include estimating a fuel tank pressure in response to a refueling request, decreasing a voltage of a current supplied to an electrorheological fluid in response to the fuel tank pressure being greater than a threshold pressure, where the voltage is proportional to a depressurization of a fuel tank, and adjusting a fuel tank door position proportional to the current supplied. The adjusting includes gradually opening the door as the fuel tank pressure decreases from a pressure higher than the threshold pressure to a pressure less than or equal to the threshold pressure. The fuel tank door is in a fully open position when no current is supplied to the electrorheological fluid. Decreasing the voltage in response to the fuel tank pressure being less than or equal to the threshold pressure includes decreasing the voltage supplied to zero and moving the fuel tank door to the fully open position.

Additionally or alternatively electrorheological fluid is located in a hinge coupled to a spring, the hinge comprising electrodes for electrically charging the electrorheological fluid, and where the spring is configured to press against the refueling door and provide an outward force. The voltage of the current supplied to the electrorheological fluid outside of the refueling request is greater than a threshold voltage. The fully closed position includes the refueling door being flush with a side panel of a vehicle. The outward force overcomes a viscosity of the electrorheological fluid when the voltage of the current supplied is less than or equal to the threshold voltage, and where the fuel tank door is incrementally opened via the outward force as the voltage of the current supplied decreases, and where incrementally opening the refueling door includes the refueling door becoming increasingly oblique to the side panel.

FIG. 3 shows an example of refueling assembly 219 configured with a capless refueling assembly. As such, components previously introduced may be similarly numbered in subsequent figures. Refueling assembly 219 includes a cover 300. The cover 300 is configured to enclose components in the assembly. The refueling assembly 219 further includes an external housing 302 configured to at least partially enclose various internal components of the refueling assembly 219. The refueling assembly 219 further includes an upstream door 310 having a hinge 324. The upstream door 310 is inset from the cover 300. A preloaded upstream spring 322 may be coupled to the upstream door 310 and the external housing 302. The preloaded upstream spring 322 is coupled to the upstream door 310 providing a return force to the door when opened. The upstream spring 322 is configured to provide a return force when the upstream door 310 is depressed via a fuel nozzle. The upstream spring 322 may be a passive spring with a fixed return force, or may be coupled to a solenoid configured to provide a greater return force when the solenoid is active. In this way, the upstream door 310 may close after a fuel nozzle is removed during a refueling event. Thus, the upstream door 310 automatically closes without assistance from a refueling operator. As a result, the refueling process is simplified.

A seal 312 may be attached to the upstream door 310. Specifically, the seal 312 may extend around the periphery of the upstream door 310, in some examples. When the upstream door 310 is in a closed position the seal may be in face sharing contact with the cover 300. In this way, the evaporative emissions from the refueling assembly 219 are reduced.

The refueling assembly 219 further includes a downstream door 326 positioned downstream of the upstream door 310. The downstream door 326 includes a hinge 328 and has a preloaded downstream spring 330 coupled thereto. The preloaded downstream spring 330 is coupled to the downstream door 326 providing a return force to the downstream door 326 when opened. The downstream spring 330 is also coupled to the external housing 302. The downstream spring 330 is configured to provide a return force to the downstream door 326 when the downstream door 326 is in an open position. The downstream spring 330 may be a passive spring with a fixed return force, or may be coupled to a solenoid configured to provide a greater return force when active. The downstream door 326 may also include a seal 314 (e.g., flap seal). The seal 314 may be positioned around the periphery of the downstream door 326, in some examples. The downstream door 326 enables the evaporative emissions during the refueling process to be further reduced. The downstream door 326 is arranged perpendicular to the fuel flow when closed, in the depicted example. However, other orientations of the downstream door 326 are possible.

Refueling assembly 219 includes filler pipe 374. Filler pipe 374 is in fluidic communication with fuel tank 220 via fuel fill line 211, as shown in FIG. 2. Refueling assembly 219 may further include a flow guide (not shown) which is arranged downstream of downstream door 326. Flow guide may be at least partially enclosed by filler pipe 374. The refueling assembly 219 is configured such that a fuel dispensing nozzle 170 may be inserted into the refueling inlet 372, thereby pushing in the upstream door 310 as well as the downstream door 326.

Refueling assembly includes a refueling door 350 which may be located in a body panel of the vehicle, inset such that the refueling door is flush with the body panel when closed. Refueling door 350 is coupled to a refueling locking mechanism 345. Refueling locking mechanism 345 may be a latch or a clutch which locks a refueling door 350. Specifically, the refueling locking mechanism 345 comprises a hinge 344 filled with an electrorheological fluid 340, indicated by a dotted fill. A preloaded spring 342 may be coupled refueling door 350 and the hinge 344. The preloaded spring 342 provides an outward force to swing the refueling door 350 open. In this way, a direction of the force applied by the spring 342 is opposite to the springs 322 and 330.

Electrical source 380 may flow current to the electrorheological fluid 340 based on instructions from controller 212 to alter a viscosity of the fluid. As an example, the viscosity increases in response to a voltage of the current increasing. Thus, the viscosity decreases in response to the voltage of the current decreasing. For the electrorheological fluid 340 at higher viscosities, resistance against the spring 342 increases such that the outward force of the spring 342 against the refueling door 350 decreases. In one example, when a threshold voltage is supplied to the electrorheological fluid 340, the hinge 344 cannot rotate, thereby preventing the spring 344 from opening the refueling door (e.g., the outward force is substantially zero and/or counteracted by the increased viscosity of the fluid). Furthermore, when zero voltage and/or current is supplied to the electrorheological fluid 340, the hinge 344 rotates, allowing the spring 344 to open the refueling door (e.g., the outward force is substantially equal to the preloaded amount).

In this way, a position of the refueling door 350 is adjusted based on a voltage supplied to the electrorheological fluid 340, wherein zero voltage corresponds to the refueling door 350 being fully open and the threshold voltage corresponds to the refueling door 350 being closed. Additionally, the voltage may be adjusted to values between zero and the threshold voltage such that the refueling door 350 may be actuated to positions between the fully open and closed positions. In one example, the closed position corresponds to 0° angle between the refueling door and a side panel of the vehicle and the fully open position corresponds to a 90° angle between the refueling door and the side panel. Thus, the refueling door may be actuated to angles between 0 and 90 degrees during a depressurization of the fuel tank in response to a fuel tank pressure being greater than a threshold pressure during a refueling request, as will be described below.

The electrorheological fluid 340 comprises electrical conductors, including one or more of copper, silver, and aluminum, in one example. Alternatively, the electrorheological fluid 340 comprises nanoparticles responsive to an electrical current. At any rate, any of the above examples of the electrorheological fluid 340 shift in viscosity based on the voltage provided by the electrical source 380 through electrodes 346 and 348, as shown in FIG. 3B. In one example, the electrode 346 is a positive electrode and is herein referred to as positive electrode 346. Thus, the electrode 348 is a negative electrode and is herein referred to as negative electrode 348. The positive 346 and negative 348 electrodes are located inside the hinge 344 in contact with the electrorheological fluid 340. Voltage through the electrodes 346 and 348 is adjusted based on instructions from the controller to the electrical source 380. In one example, the voltage is adjusted based on a depressurization rate of the fuel tank, wherein the voltage decreases proportionally to the depressurization rate. Alternatively, the current is adjusted based on a pressure of the fuel tank, wherein the current decreases in response to the pressure of the fuel tank decreasing.

The electrodes 346 and 348 are physically coupled to an interior of the hinge 344. The positive electrode 346 and the negative electrode 348 are spaced away from one another and do not touch. In one example, the electrodes 346 and 348 are oriented parallel to one another within the hinge 344. Alternatively, the electrodes 346 and 348 may be oriented perpendicular to one another with overlapping portions of the electrodes 346 and 348 being spaced away from one another.

Returning to FIG. 3A, refueling assembly 219 includes an externally-mounted refuel request button 306 coupled to a refueling door switch 308. Refuel request button 306 may be located on the refueling assembly cover 300, the refuel request button configured to be depressed when a refueling operator pushes the refueling door 350 towards the refueling assembly. In some examples, the refueling door 350 comprises an ingot or other indication signaling to an operator a location of the refuel request button 306. Additionally or alternatively, the refuel request button 306 may be located in a vehicle cabin (e.g., dashboard-mounted button), wherein a driver presses the button 306 before exiting the cabin to refuel the fuel tank.

Although the refueling assembly 219 described above includes a capless assembly, it will be appreciated that refueling door 350 and locking mechanism 345 may be used with a capped refueling assembly without departing from the scope of the present disclosure.

Thus, a system comprising a fuel tank comprising a refueling door, a refueling request button, a spring coupled to a hinge, and where the spring is configured to press the refueling door toward a fully open position, and where the hinge comprises an electrorheological fluid electrically coupled to electrodes for adjusting a viscosity of the fluid. A controller storing instructions in non-transitory memory that when executed enable the controller to estimate a fuel tank pressure in response to the refueling request button being depressed, compare the fuel tank pressure to a threshold pressure, decrease a voltage supplied to the fluid to a voltage less than a threshold voltage and greater than zero in response to the fuel tank pressure being greater than the threshold pressure, and gradually open the refueling door. By doing this, the refueling door is incrementally opened to positions between fully opened and closed positions, thereby indicating to a driver and/or fuel attendant that a depressurization is underway. Gradually opening the refueling door includes opening the refueling door at a rate based on a depressurization rate such that the refueling door is fully open when the fuel tank pressure is equal to the threshold pressure.

Additionally or alternatively, the controller includes further instructions stored in non-transitory memory that when executed enable the controller to decrease the voltage supplied to the fluid to zero in response to the fuel tank pressure being less than or equal to the threshold pressure to rapidly open the refueling door. Rapidly opening the door is faster than gradually opening the door, where rapidly opening the door includes reducing a viscosity of the electrorheological fluid to zero and allowing the spring to apply all of its outward force onto the refueling door. As such, while gradually opening the refueling door may stall at positions between fully open and closed positions, the refueling door quickly switches from the closed to the fully open position during the rapid opening. This is allowed when the fuel tank pressure is less than the threshold pressure since a depressurization is not demanded (e.g., likelihood of fuel spilling out of a fuel filler neck is substantially zero).

Additionally or alternatively, the refueling door is maintained in the closed position during vehicle conditions outside of the refueling request. Thus, the voltage provided to the electrorheological fluid is substantially equal to the threshold voltage and the viscosity of the fluid is high. During a refueling request, the voltage decreases from the threshold voltage to zero. However, a rate of the voltage decrease is based on a fuel tank pressure, wherein as the fuel tank pressure decreases the rate of voltage decrease increases. Said another way, as the fuel tank pressure decreases, the viscosity of the electrorheological fluid decreases by decreasing the voltage supplied to the fluid. Alternatively, if the fuel tank pressure is below the threshold pressure when the refueling request is received, then current supplied to the electrorheological fluid is terminated, resulting in zero voltage emitting from electrodes to the fluid.

FIG. 4 shows a method 400 for adjusting a current applied to an electrorheological fluid and monitoring a fuel tank pressure. The method 400 may be used with components previously described, including but not limited to refueling door 350, refuel request button 306, and electrorheological fluid 340 of FIG. 3A. Instructions for carrying out method 400 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 400 begins at 402, where the method 400 includes determining, estimating, and measuring current engine operating parameters. Current engine operating parameters may include at least one or more of engine temperature, engine speed, ambient temperature, ambient pressure, ambient humidity, fuel tank pressure, vehicle speed, throttle position, pedal position, and air/fuel ratio.

At 404, the method 404 includes determining if a refueling event is being requested. The refueling event is requested by depressing a refueling button inside a vehicle cabin and/or by depressing a refueling button located adjacent a refueling door (e.g., refuel request button 306 of FIG. 3A). As such, if a refueling request is not detected, then the method 400 proceeds to 406 to maintain current engine operating parameters and maintains the refueling door in a locked position. In one example, this includes supplying current with a voltage above a threshold voltage to the electrorheological fluid to overcome an outward force of a spring by increasing its viscosity to maintain the refueling door in the locked position.

In one example, the controller 212 signals to the electrical source 380 to supply current with a voltage above the threshold voltage to increase a viscosity of the electrorheological fluid 340 to overcome the outward force of spring 342 to maintain refueling door 350 in a locked position. The threshold voltage is substantially equal to 5 V in one example. It will be appreciated that the threshold current may be less or more than 5 V in other examples without departing from the scope of the present disclosure.

If the refueling button is depressed and the refueling event is requested, then the method 400 proceeds to 408 to determine if a fuel tank pressure is greater than a threshold pressure. In one example, the threshold pressure is substantially equal to an ambient pressure. Alternatively, the threshold pressure may be equal to a fixed pressure (e.g., 760 mmHg). If the fuel tank pressure is less than the threshold pressure, then the method proceeds to 410 to open the refueling door by decreasing and/or terminating current flow to the electrorheological fluid. In this way, the refueling door is rapidly opened and the refueling door swings from the closed position to the fully open position without stalling on and/or stopping at any positions therebetween. When the refueling door is in the fully open position, a nozzle may be inserted into the fuel filler neck and fuel may be admitted to the fuel tank. Thus, the fuel tank may not receive fuel when the refueling door is in a position outside of the fully open position (e.g., closed position or between the closed and fully open positions).

In one example, the electrorheological fluid receives current with a voltage greater than the threshold voltage during engine operating parameters outside of a refueling request. By doing this, the refueling door remains locked. As such, upon depressing the refueling request button when the fuel tank pressure is less than or equal to the threshold pressure, the voltage of the current supplied to the electrorheological fluid is immediately terminated. As a result, the electrorheological fluid decreases to a lowest viscosity and the refueling door is swung open due to an outward force of a spring. The refueling door is rapidly opened when the refueling request is received in response to a fuel tank pressure being equal or less than the threshold pressure since a likelihood of fuel spillage from a fuel filler neck to an ambient atmosphere is substantially zero.

If the fuel tank pressure is greater than the threshold pressure (e.g., ambient pressure) then method 400 proceeds to 412 to apply current with a voltage greater than the threshold voltage. In this way, the likelihood of fuel spilling out of the fuel tank and/or vapors being released from the fuel tank to the ambient atmosphere is substantially high. By applying current to the electrorheological fluid, its viscosity is substantially equal to a highest viscosity capable of fully countering the outward force of the spring. Thus, the refueling door remains in the locked position.

As described above, the electrorheological fluid receives current with a voltage greater than the threshold voltage during engine operating parameters outside of the refueling request. As such, in some embodiments, 412 includes continuing to flow current with a voltage greater than the threshold voltage in response to receiving the refueling request when the fuel tank pressure is greater than the threshold pressure.

At 414, the method 400 includes depressurizing the fuel tank and calculating a rate of depressurization. Fuel vapors may flow from the fuel tank to a fuel vapor canister (e.g., canister 222 of FIG. 2) via opening one or more of valves 283, 285, 287, and 252 shown in FIG. 2. In one example, at least FTIV 252 is opened during fuel tank depressurization. The rate of depressurization may be calculated based on feedback from a fuel tank pressure sensor measuring a change in fuel tank pressure. Alternatively, the rate of depressurization may be calculated based on a rate of vapor flow from the fuel tank to the canister.

At 416, the method 400 includes adjusting the voltage of current supplied to the electrorheological fluid, where the adjusting is based on the rate of depressurization. In one example, a rate at which the voltage decreases is proportional to a rate at which the fuel tank pressure decreases (e.g., the depressurization rate). If the rate of depressurization is relatively high, then the voltage decreases more quickly than if the rate of depressurization is relatively low. In this way, the refueling door open more quickly when the depressurization rate is higher.

In one example, the routine adjusts the voltage of the current based on the depressurization rate. For example, the controller may determine a control signal to send to the electric source, such as a voltage decrease based on the pressure change of the fuel tank. The pressure change may be based on a pressure change within the fuel tank during the refueling request. The controller may determine an amount of voltage decrease through a determination that directly takes into account the depressurization rate, such as decreasing the amount of voltage with decreasing fuel tank pressure. The controller may alternatively determine the voltage decrease based on a calculation using a look-up table with the input being initial fuel tank pressure (e.g., prior to receipt of the refueling request) and the output being time needed to sufficiently depressurize the fuel tank.

At 418, the method 400 includes opening the fuel tank door. As the voltage to the electrorheological fluid decreases, the viscosity of the fluid decreases, thereby allowing the outward force of the spring to push the door open. However, since the voltage is greater than zero, the viscosity of the fluid is sufficient to prevent the refueling door from moving to the fully open position. As such, the door is increasingly opened as the voltage is increasingly decreased, wherein higher voltage values correspond to a closed or more closed position of the refueling door and lower voltage values correspond to a fully open or more open position. Thus, the refueling door position is inversely related to voltage, in one example.

In one example, the voltage is adjusted based on a duration of time needed for the fuel tank pressure to become less than or equal to the threshold pressure. By doing this, the voltage is continuously decreased such that a duration of time needed to fully open the refueling door from a fully closed position is substantially equal to the duration of time needed for the fuel tank to depressurize to the threshold pressure. Said another way, the voltage is adjusted to gradually open the door at a rate substantially similar to a rate of depressurization such that the door is fully open once the fuel tank pressure is less than or equal to the threshold pressure. In this way, a driver and/or fuel attendant are visually notified that the refueling request has been received.

At 420, the method 400 includes determining if a fuel tank pressure is less than or equal to the threshold pressure. If the fuel tank pressure is greater than the threshold pressure, then the method 400 continues to supply some voltage to the electrorheological fluid and monitors the fuel tank pressure. In this way, the refueling door is not fully open and fuel may not be admitted to the fuel tank. If the fuel tank pressure is less than or equal to the threshold pressure, then the method 400 continues to 424 to stop applying voltage to the electrorheological fluid. By doing this, the viscosity of the fluid decreases to a lowest value and the outward force of the spring moves the refueling door to a fully open position where a vehicle operator or fuel attendant may admit fuel to the fuel tank. For a remainder of the refueling event, following the fuel tank pressure becoming less than or equal to the threshold pressure, the voltage supplied to the electrorheological fluid may remain substantially zero.

At 426, the method 400 includes supplying current with a voltage greater than the threshold voltage to electrorheological fluid following termination of refueling request. The refueling request is terminated by a vehicle operator or fuel attendant by depressing the refuel request button, which may be an externally-mounted button located on the refueling door (e.g., button 306 of FIG. 3A) or a dashboard-mounted button located in a vehicle cabin. Alternatively, the vehicle operator or fuel attendant may manually close the refueling door, which may also indicate termination of the refueling event. Additionally or alternatively, the refueling request may be terminated in response to a fuel tank volume being equal to a threshold volume (e.g., fuel tank filled-up with a desired amount of fuel).

Thus, a method comprises applying a current having a voltage greater than threshold voltage to an electrorheological fluid in a locking mechanism of a refueling door and decreasing the voltage of the current to less than the threshold voltage to gradually open the refueling door in response to a fuel tank pressure being greater than a threshold pressure upon receiving a refueling request. The electrorheological fluid is responsive to the current, and wherein a viscosity of the electrorheological fluid increases as the voltage of the current increases. Gradually opening the refueling door includes moving the door from a closed position to the fully open position in an amount of time similar to time needed to depressurize the fuel tank pressure to less than or equal to the threshold pressure. Additionally or alternatively, decreasing the voltage includes decreasing the voltage by a rate directly proportional to a rate at which the fuel tank pressure decreases. By doing this, the refueling door may stall or stop on a position between the closed and fully open positions, wherein the fully open position corresponds to a position of the refueling door where fuel may be admitted to the fuel tank.

Additionally or alternatively, the locking mechanism comprises a spring and a hinge, where the spring provides an outward opening force and where the hinge houses the electrorheological fluid. The refueling door is closed when the voltage of the current is greater than the threshold voltage, and where the refueling door is at least partially open when the voltage is less than or equal to the threshold voltage. In one example, in response to a fuel tank pressure being less than or equal to the threshold pressure, the voltage is decreased to zero and the refueling door is rapidly opened, wherein rapidly opening the refueling door is faster than gradually opening the refueling door. The threshold pressure is equal to an ambient pressure.

FIG. 5 shows an example timeline for refueling using the method described herein and with regards to FIG. 4. Timeline 500 includes plot 510 indicating the status of a tank refueling request over time, plot 520 indicating the pressure inside a fuel tank over time; plot 530 indicating the status of a refueling door lock over time, and plot 540 indicating the voltage of a current supplied to the electrorheological fluid. Line 522 represents a threshold pressure substantially equal to ambient pressure and line 542 represents the threshold voltage, which is substantially equal to five volts.

Prior to time $t_1$, no tank refuel request is indicated, as shown by plot 510. As such, the refueling door lock status is in a locked (e.g., fully closed) position, as shown by plot 530. The current voltage is greater than the threshold voltage, as shown by plot 540 and line 542, respectively. In this way, the electrorheological fluid inside a hinge coupled to a spring has an increased viscosity, thereby preventing the spring from applying its outward force onto the refueling door. As shown by plot 520, the fuel tank pressure is less than the threshold pressure, as shown by plot 520 and line 522. As such, the fuel tank pressure is less than an ambient pressure.

At time $t_1$, a refueling request is received, as shown by plot 710. As described above, if the refueling request is received when the fuel tank pressure is less than or equal to the threshold pressure, then the refueling door may be rapidly opened. As shown, the refueling door position moves from the closed to the fully open position without stopping at any positions located therebetween As such, the voltage decreases from greater than the threshold voltage to 0V. In this way, the current is terminated. This allows the spring is apply all of its outward force to the refueling door, forcing into a fully open position. Thus, as $t_1$, a vehicle operator and/or fuel attendant may admit fuel into the fuel tank.

From time $t_1$ to time $t_2$, the refueling request continues and the fuel tank pressure increases as fuel is admitted into the fuel tank. The current voltage remains at 0V, and as a result, the refueling door remains in the fully open position.

At time $t_2$, the refueling is complete, ending the refueling request. As described above, the refueling request may be terminated by the vehicle operator by either manually closing the refueling door or depressing the refueling button. In response, the voltage is increased to a voltage greater than the threshold voltage, thereby increasing the electrorheological fluid viscosity, preventing the spring from pushing the door open, and locking the refueling door in the closed position. The fuel tank pressure is substantially equal to the threshold pressure.

From time $t_2$ and $t_3$, the refueling request is off. The fuel tank pressure increases to a relatively high pressure greater than the threshold pressure. In one example, the fuel tank pressure increases due to one or more of a fuel tank temperature increasing and vehicle turbulence. The current voltage is greater than the threshold current and as a result, the refueling door remains locked.

At time $t_3$, the refueling request is received. However, contrary to the refueling request at $t_1$, the fuel tank pressure is greater than the threshold pressure. As such, the refueling door lock status remains in the locked position corresponding to a fully closed position of the door. In one example, the refueling door in the fully closed position includes the refueling door being flush with a side panel of a vehicle. To fulfill the refueling request, a depressurization of the fuel tank is initiated and the fuel tank pressure begins to decrease. The depressurization includes flowing fuel vapors from the fuel tank to a fuel canister, in one example. Alternatively, a vacuum may be applied to the fuel tank. At any rate, the voltage begins to decrease at a rate proportional to a rate of depressurization. In this way, the current voltage will become substantially equal to 0 when the fuel tank pressure becomes substantially equal to the threshold pressure.

From time $t_3$ to time $t_4$, the refueling request continues. The fuel tank pressure continues to decrease toward the threshold pressure from a relatively high pressure. Thus, the current voltage decreases below the threshold voltage toward 0V at a similar rate. By doing this, the refueling door lock status is adjusted between the closed and fully open positions. As such, the refueling door is no longer flush with the side panel of the vehicle. In one example, the closed position includes the refueling door being parallel to the side panel and the fully open position includes the refueling door being perpendicular to the side panel. As such, an angle of the refueling door during the depressurization may be between 0 and 90 degrees. However, fuel may not be admitted to the fuel tank until the refueling door is at the fully open position. At any rate, by gradually opening the door during the depressurization, the vehicle operator (or fuel attendant) is provided a visual indication regarding a condition of the refueling event. In this way, adjusting a rate of opening of a refueling door in response to a fuel tank depressurization rate is accomplished via an amount of current supplied to an electrorheological fluid.

At time $t_4$, the refueling request continues. The fuel tank pressure is substantially equal to the threshold pressure. In response, the current voltage decreases to 0V and the refueling door moves to the fully open position. In this way, the vehicle operator may begin admitting fuel into the fuel tank.

From time $t_4$ to time $t_5$, the refueling request continues. Fuel is being admitted into the fuel tank and as a result, the current voltage remains substantially equal to 0V and the refueling door position is fully open. The fuel tank pressure remains substantially equal to the threshold pressure.

At time $t_5$, the refueling event is done, ending the refueling request. In response to the refueling request ending, the current voltage is increased to a voltage greater than the threshold voltage and the refueling door is in the closed position, wherein the door is locked. The fuel tank pressure remains substantially equal to the threshold pressure.

In this way, a refueling door is gradually opened in proportion to a depressurization rate of a fuel tank when a fuel tank pressure is greater than an ambient pressure. In one example, a rate of opening the refueling door is adjusted by adjusting a voltage of a current supplied to an electrorheological fluid located in a locking mechanism of the refueling door. The technical effect of placing the electrorheological fluid in the locking mechanism of the refueling door is to precisely adjust an opening rate of the refueling door, thereby providing a real-time indication of the depressurization of the fuel tank to a vehicle operator in response to the refueling request. By doing this, emissions during refueling events when the fuel tank pressure is greater than the ambient pressure are mitigated and/or prevented.

A method comprising applying a current having a voltage greater than a threshold voltage to an electrorheological fluid in a locking mechanism of a refueling door and decreasing the voltage of the current to less than the threshold voltage to gradually open the refueling door in response to a fuel tank pressure being greater than a threshold pressure upon receiving a refueling request. A first example of the method further includes where electrorheological fluid is responsive to the current, and where a viscosity of the electrorheological fluid increases as the voltage of the current increases. A second example of the method, optionally including the first example, further includes where gradually opening the refueling door includes moving the door from a closed position to a fully open position in an amount of time similar to time needed to depressurize the fuel tank pressure to less than or equal to the threshold pressure. A third example of the method, optionally including the first and/or second examples, further includes where the threshold pressure is equal to an ambient pressure. A fourth example of the method, optionally including one or more of the first through third examples, further includes the locking mechanism comprises a spring and a hinge, where the spring provides an outward opening force and where the hinge houses the electrorheological fluid. A fifth example of the method, optionally including one or more of the first through fourth examples, further includes where the refueling door is closed when the voltage of the current is greater than the threshold voltage, and where the refueling door is at least partially open when the voltage is less than or equal to the threshold voltage. A sixth example of the method, optionally including one or more of the first through fifth examples, further includes where in response to a fuel tank pressure being less than or equal to the threshold pressure, the voltage decreases to zero and the refueling door is rapidly opened, wherein rapidly opening the refueling door is faster than gradually opening the refueling door. A seventh example of the method, optionally including one or more of the first through sixth examples, further includes where decreasing the voltage includes decreasing the voltage by a rate directly proportional to a rate at which the fuel tank pressure decreases.

A method comprising estimating a fuel tank pressure in response to a refueling request, decreasing a voltage of a current supplied to an electrorheological fluid in response to the fuel tank pressure being greater than a threshold pressure, where the voltage is proportional to a depressurization of a fuel tank, and adjusting a fuel tank door position proportional to the current supplied. A first example of the method further includes where the adjusting includes gradually opening the door as the fuel tank pressure decreases from a pressure higher than the threshold pressure to a pressure less than or equal to the threshold pressure. A second example of the method optionally including the first example further includes where the fuel tank door is in a fully open position when no current is supplied to the electrorheological fluid. A third example of the method, optionally including the first and/or second examples, further includes where decreasing the voltage in response to the fuel tank pressure being less than or equal to the threshold pressure includes decreasing the voltage supplied to zero and moving the fuel tank door to a fully open position. A fourth example of the method optionally including one or more of the first through third examples further includes where the electrorheological fluid is located in a hinge coupled to a spring, the hinge comprising electrodes for electrically charging the electrorheological fluid, and where the spring is configured to press against the refueling door and provide an outward force. A fifth example of the method optionally including one or more of the first through fourth examples further includes where the voltage of the current supplied to the electrorheological fluid outside of the refueling request is greater than a threshold voltage, and where the threshold voltage corresponds to a closed position further comprising the refueling door being flush with a side panel of a vehicle. A sixth example of the method, optionally including one or more of the first through fifth examples, further includes where the outward force overcomes a viscosity of the electrorheological fluid when the voltage of the current supplied is less than or equal to the threshold voltage, and where the fuel tank door is incrementally opened via the outward force as the voltage of the current supplied decreases, and where incrementally opening the refueling door includes the refueling door becoming increasingly oblique to the side panel.

A system comprising a fuel tank comprising a refueling door, a refueling request button, a spring coupled to a hinge, and where the spring is configured to press the refueling door toward a fully open position, and where the hinge comprises an electrorheological fluid electrically coupled to electrodes for adjusting a viscosity of the fluid, and a controller storing instructions in non-transitory memory that when executed enable the controller to estimate a fuel tank pressure in response to the refueling request button being depressed, compare the fuel tank pressure to a threshold pressure, decrease a voltage of a current supplied to the fluid to a voltage less than or equal to a threshold voltage and greater than zero in response to the fuel tank pressure being greater than the threshold pressure, and gradually open the refueling door. A first example of the system further includes where the controller includes further instructions stored in non-transitory memory that when executed enable the controller to decrease the voltage of the current supplied to the fluid to zero in response to the fuel tank pressure being less than or equal to the threshold pressure to rapidly open the refueling door. A second example of the system, optionally including the first example, further includes where gradually opening the refueling door includes opening the refueling door at a rate proportional to a depressurization rate such that the refueling door is fully open when the fuel tank pressure is equal to the threshold pressure, and where rapidly opening the refueling door includes opening the refueling door according to an outward force of the spring. A third example of the system, optionally including the first and/or second examples, further includes where the fluid increases to a highest viscosity in response to the voltage of the current supplied being greater than the threshold voltage to overcome an outward force of the spring and maintain the refueling door in a closed position, and where a voltage of the current supplied equaling zero corresponds to a voltage configured to decrease the viscosity of the fluid to a lowest viscosity to allow the outward force of the spring to actuate the refueling door to the fully open position. A fourth examples of the system, optionally including one or more of the first through third examples, further includes where the refueling door is maintained in the closed position during vehicle conditions outside of the refueling request.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
applying a current having a voltage greater than a threshold voltage to an electrorheological fluid in a locking mechanism of a refueling door; and
decreasing the voltage of the current to less than the threshold voltage to gradually open the refueling door in response to a fuel tank pressure being greater than a threshold pressure upon receiving a refueling request.

2. The method of claim 1, wherein the electrorheological fluid is responsive to the current, and where a viscosity of the electrorheological fluid increases as the voltage of the current increases.

3. The method of claim 1, wherein gradually opening the refueling door includes moving the door from a closed position to a fully open position in an amount of time similar to time needed to depressurize the fuel tank pressure to less than or equal to the threshold pressure.

4. The method of claim 1, wherein the threshold pressure is equal to an ambient pressure.

5. The method of claim 1, wherein the locking mechanism comprises a spring and a hinge, where the spring provides an outward opening force and where the hinge houses the electrorheological fluid.

6. The method of claim 5, wherein the refueling door is closed when the voltage of the current is greater than the threshold voltage, and where the refueling door is at least partially open when the voltage is less than or equal to the threshold voltage.

7. The method of claim 1, further comprising in response to a fuel tank pressure being less than or equal to the threshold pressure, the voltage decreases to zero and the refueling door is rapidly opened, wherein rapidly opening the refueling door is faster than gradually opening the refueling door.

8. The method of claim 1, wherein decreasing the voltage includes decreasing the voltage by a rate directly proportional to a rate at which the fuel tank pressure decreases.

9. A method comprising:
estimating a fuel tank pressure in response to a refueling request,
decreasing a voltage of a current supplied to an electrorheological fluid in response to the fuel tank pressure being greater than a threshold pressure, where the voltage is proportional to a depressurization of a fuel tank; and
adjusting a fuel tank door position proportional to the current supplied.

10. The method of claim 9, wherein the adjusting includes gradually opening the door as the fuel tank pressure decreases from a pressure higher than the threshold pressure to a pressure less than or equal to the threshold pressure.

11. The method of claim 9, wherein the fuel tank door is in a fully open position when no current is supplied to the electrorheological fluid.

12. The method of claim 9, wherein decreasing the voltage in response to the fuel tank pressure being less than or equal to the threshold pressure includes decreasing the voltage supplied to zero and moving the fuel tank door to a fully open position.

13. The method of claim 9, wherein the electrorheological fluid is located in a hinge coupled to a spring, the hinge comprising electrodes for electrically charging the electrorheological fluid, and where the spring is configured to press against the refueling door and provide an outward force.

14. The method of claim 13, wherein the voltage of the current supplied to the electrorheological fluid outside of the refueling request is greater than a threshold voltage, and where the threshold voltage corresponds to a closed position further comprising the refueling door being flush with a side panel of a vehicle.

15. The method of claim 14, where the outward force overcomes a viscosity of the electrorheological fluid when the voltage of the current supplied is less than or equal to the threshold voltage, and where the fuel tank door is incrementally opened via the outward force as the voltage of the current supplied decreases, and where incrementally opening the refueling door includes the refueling door becoming increasingly oblique to the side panel.

16. A system comprising:
a fuel tank comprising a refueling door;
a refueling request button;
a spring coupled to a hinge, and where the spring is configured to press the refueling door toward a fully open position, and where the hinge comprises an electrorheological fluid electrically coupled to electrodes for adjusting a viscosity of the fluid; and
a controller storing instructions in non-transitory memory that when executed enable the controller to:
estimate a fuel tank pressure in response to the refueling request button being depressed, compare the fuel tank pressure to a threshold pressure, decrease a voltage of a current supplied to the fluid to a voltage less than or equal to a threshold voltage and greater than zero in response to the fuel tank pressure being greater than the threshold pressure, and gradually open the refueling door.

17. The system of claim 16, wherein the controller includes further instructions stored in non-transitory memory that when executed enable the controller to decrease the voltage of the current supplied to the fluid to zero in response to the fuel tank pressure being less than or equal to the threshold pressure to rapidly open the refueling door.

18. The system of claim 17, wherein gradually opening the refueling door includes opening the refueling door at a rate proportional to a depressurization rate such that the refueling door is fully open when the fuel tank pressure is equal to the threshold pressure, and where rapidly opening the refueling door includes opening the refueling door according to an outward force of the spring.

19. The system of claim 16, wherein the fluid increases to a highest viscosity in response to the voltage of the current supplied being greater than the threshold voltage to overcome an outward force of the spring and maintain the refueling door in a closed position, and where a voltage of the current supplied equaling zero corresponds to a voltage configured to decrease the viscosity of the fluid to a lowest viscosity to allow the outward force of the spring to actuate the refueling door to the fully open position.

20. The system of claim 16, wherein the refueling door is maintained in the closed position during vehicle conditions outside of the refueling request.

* * * * *